Nov. 13, 1928.  
A. W. BARNARD  
1,691,631  
COIN CONTROLLED MACHINE  
Filed May 29, 1926
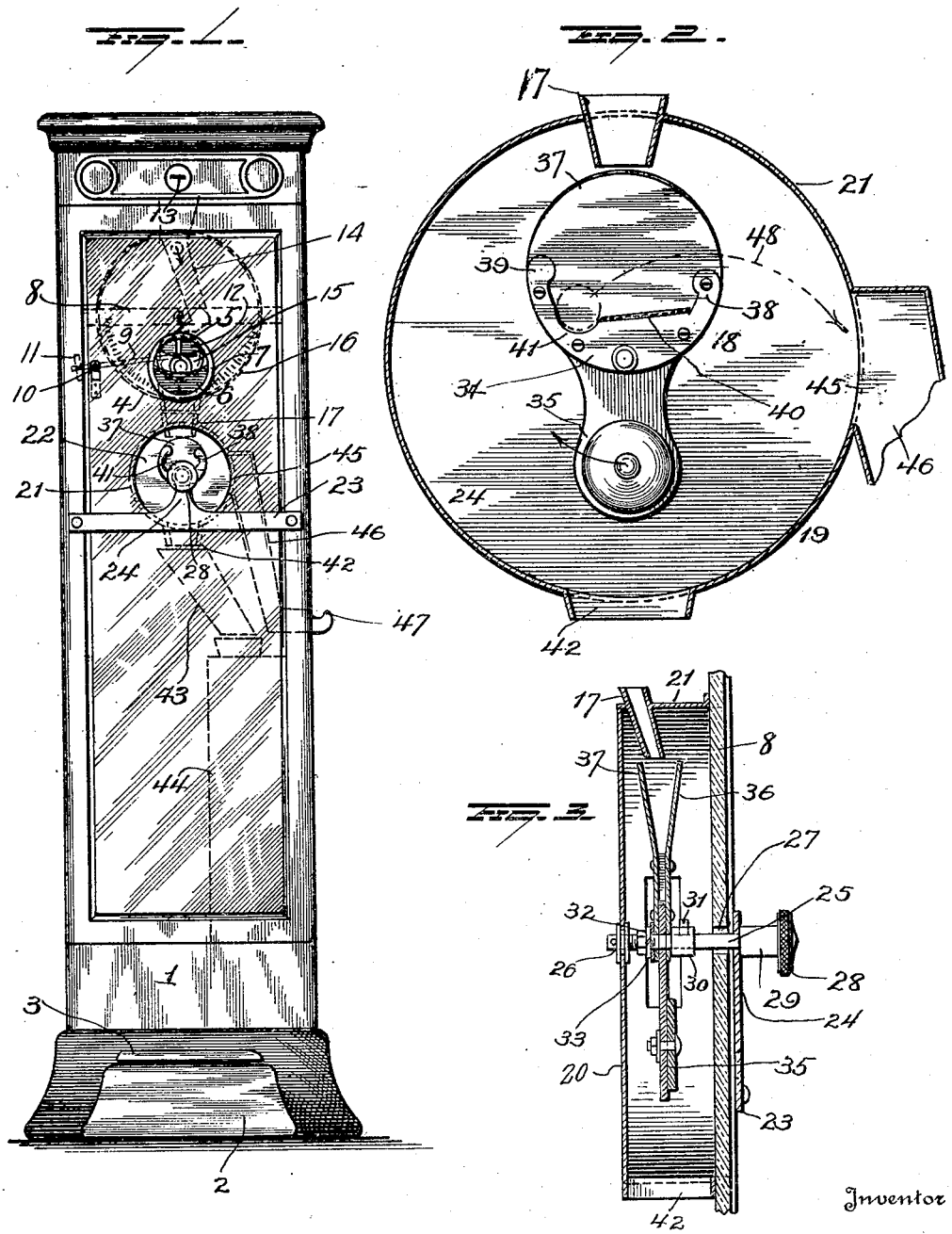
Inventor
A. W. Barnard
By Seymour & Bright
Attorneys Patented Nov. 13, 1928.

1,691,631

UNITED STATES PATENT OFFICE.

ARTHUR W. BARNARD, OF NEWTON CENTER, MASSACHUSETTS, ASSIGNOR TO COLONIAL SCALE COMPANY, OF BOSTON, MASSACHUSETTS, A CORPORATION OF MASSACHUSETTS.

COIN-CONTROLLED MACHINE.

Application filed May 29, 1926. Serial No. 112,574.

This invention relates to improvements in coin controlled machines and more particularly to means operable under control of the patron to return a coin to him.

One object of the invention is to provide manually operable means to cause return of a coin to a patron, return of the coin being dependent upon the skill exercised by the patron in operating said means.

A further object is to provide a weighing machine in which the weight of a person standing on the platform will be displayed, with means controlled by the skill of the patron after he has stepped from the platform, to effect return of the coin.

A further object is to provide a weighing machine having a platform and controlled by a coin, with manually operable means whereby the coin may be returned to the patron, said means being visible to the patron and receiving a coin only after the patron shall have stepped from the platform of the machine.

With these and other objects in view, the invention consists in certain novel features of construction and combinations of parts as hereinafter set forth and pointed out in the claims.

In the accompanying drawings,—

Figure 1 is a view in front elevation of a coin controlled weighing scale showing an application of my improvements thereto.

Figure 2 is an enlarged sectional view illustrating the coin return means, and

Figure 3 is a sectional view taken at right angles to Figure 2.

The casing of a weighing scale is represented at 1 and at the base of said casing, an enlargement 2 is provided for the accommodation of a platform 3, the latter being connected in any suitable manner with weighing mechanism within the casing. Any suitable weighing mechanism may be employed except that it should include a graduated dial on which would be indicated the weight of a person standing on the platform, which information would be displayed under certain conditions as hereinafter explained. It will suffice for the purpose of illustrating the present invention to show the dial 4 of the weighing mechanism and an indicator 5 cooperable with said dial. In the type of machine illustrated in the drawings, a portion of the dial is normally covered by a shutter 6 and this shutter as well as a portion of the dial may be seen through a transparent window 7 in a mirror 8 which constitutes a portion of the front of the door of the casing. The shutter 6 may be carried by a shaft 9 pivotally supported at 10 and provided with a weight 11 which acts to counterbalance the shutter 6 and maintain the latter in such position as to cover that portion of the dial on which the weight of a patron may be indicated. The shutter 6 carries a revoluble cup 12 which receives a coin introduced into the machine through a coin slot 13 and conveyed to said cup by a suitable chute 14. The revoluble cup is provided with a member 15 which is normally disposed in a position spaced somewhat from a flange 16 on the peripheral portion of the dial 4. In the type of weighing machine illustrated, the weighing mechanism is operated as soon as the patron steps upon the platform but his weight is not displayed until the shutter 6 shall have been moved. Movement of the shutter is caused by the weight of a coin in the coin cup 12, such weight overbalancing the weight on shaft 9 and causing the shutter to descend to disclose that portion of the dial on which the weight of the patron is indicated. When the shutter thus descends carrying the coin cup with it, the member 15 of said cup will engage the flange on dial 4. Now as soon as the patron steps from the platform, the weighing mechanism will return to normal position causing rotation of the dial and, through engagement of the dial flange 16 with the member 15 of the cup, cause the latter to be turned to discharge the coin therefrom. In the present instance, the coin will pass through a chute 17 and enter a manually operable coin holder 18. This coin holder is enclosed by a casing 19 comprising a back member 20 and an annular wall 21, the coin chute 17 passing through the latter at the top thereof. The casing 19 is disposed against the inner face of the mirror panel 8 and at this point the mercury is removed so as to provide a transparent window 22 through which contents of said casing may be viewed. A bar or bridge 23 extends across the door panel 8 and is provided with a standard 24 which affords a mounting for a shaft 25 with which the coin holder 18 is connected. This shaft also has a bearing 26 supported by the back wall 20 of the casing 19. The shaft 25 passes freely through a hole 27 in the panel 8 and carries a thumb piece 28 spaced from the standard 24 by a hub or sleeve 29. The coin holder 18 is mounted on the shaft 25 and is clamped thereto by means of a collar 30 preferably secured to the shaft by a set screw 31, and a nut 32 threaded on the shaft and having a washer 33 interposed between the same and the coin holder.

The coin holder 18 comprises a yoke 34 having a depending weighted arm 35, and two flaring disks 36 and 37 secured at respective sides of the yoke. These disks may be made of celluloid and the front disk 36 is transparent so that a coin in the holder will be exposed to view and so that printed matter on the disk 37 (which is preferably opaque) can be seen through the disk 36. The yoke is formed with upwardly projecting arms 38—39 at its respective ends and between these arms, an inclined surface 40 is provided to cause a coin to become disposed in a recess 41 adjacent the yoke arm 39. Directly below the coin holder, the peripheral wall of the casing 19 is provided with an outlet 42 which communicates with a chute 43 and the latter is adapted to discharge into a coin box 44 within the casing 1. The peripheral wall 21 is provided at a position approximately at right angles to the outlet 42, with an outlet 45 which communicates with a chute 46 and the latter discharges at its lower end into a coin-return-cup 47 which projects somewhat from the side of the casing 1.

When a coin shall have entered the device 18 (after the patron has stepped from the platform of the scales), the patron may, with the use of the knob 28, turn the device 18 and attempt to cause the coin to be thrown in the path approximately indicated by the dotted arrow 48 and enter the chute 46 so that it may be returned to him at the cup 47. As soon as the knob or thumb piece shall have been released, the device 18 will assume its normal position by reason of the weighted arm 35. It will be understood that if the skill of the patron is not such as to cause the coin to be discharged through the opening 45 to the chute 46, said coin will drop to the bottom of the casing 19 and escape through the opening 42 from which it will be conveyed through the chute 43 to the coin box 44.

Having fully described my invention what I claim as new and desire to secure by Letters-Patent, is:

1. Coin return means for a coin-controlled machine, comprising a casing having a lateral coin outlet, a counterbalanced coin holder within said casing, and means for manually operating said coin holder to throw a coin toward said lateral coin outlet.

2. Coin return means for a coin controlled machine, comprising a casing having a coin inlet at its top, a coin outlet at its bottom and a second coin outlet in one side, a coin holder pivoted in the casing under the coin inlet and having a coin-retaining pocket normally presented to the inlet, means normally holding said coin holder in position to receive a coin from said coin inlet, and manually operable means for turning said holder to throw a coin toward said lateral outlet.

3. Coin return means for a coin controlled machine, comprising a casing having a coin inlet at its top, a coin outlet at its bottom and a lateral coin outlet, a revoluble transverse shaft in said casing, an exposed knob on one end of said shaft, and a coin holder secured to said shaft and normally positioned to receive a coin from said coin inlet.

4. Coin return means for a coin controlled machine, comprising a casing having a coin inlet at its top, a coin outlet at its bottom and a lateral coin outlet, a revoluble transverse shaft in said casing, an exposed knob on one end of said shaft, and a coin holder secured to said shaft and normally positioned to receive a coin from said coin inlet, said coin holder comprising a counterweighted yoke and disks secured to the sides of said yoke and extending above the same.

5. Coin return means for a coin controlled machine, comprising a casing having a coin inlet at its top, a coin outlet at its bottom and a lateral coin outlet, a revoluble transverse shaft in said casing, an exposed knob on one end of said shaft, and a coin holder secured to said shaft and normally positioned to receive a coin from said coin inlet, said coin holder comprising a yoke having an inclined upper surface and a recess at the lower end of said surface, and spaced disks extending above the yoke.

6. Coin return means for a coin controlled machine, comprising a casing having a coin inlet at its top, a coin outlet at its bottom and a lateral coin outlet, a revoluble transverse shaft in said casing, an exposed knob on one end of said shaft, and a coin holder secured to said shaft and normally positioned to receive a coin from said coin inlet, said coin holder comprising a yoke and two spaced disks secured thereto and projecting above the same, one of said disks being of transparent material.

7. Coin return means for a coin controlled machine, comprising a casing having a coin inlet at its top, a coin outlet at its bottom and a lateral coin outlet, a revoluble transverse shaft in said casing, an exposed knob on one end of said shaft, and a coin holder secured to said shaft and normally positioned to receive a coin from said coin inlet, said coin holder comprising a yoke having a depending weighted arm and spaced disks secured to and projecting above the yoke, and means for securing said yoke and disks to said shaft.

In testimony whereof, I have signed this specification.

ARTHUR W. BARNARD.